United States Patent
Bhagwagar et al.

(10) Patent No.: US 11,655,369 B2
(45) Date of Patent: May 23, 2023

(54) TRIALKOXY FUNCTIONAL BRANCHED SILOXANE COMPOSITIONS

(71) Applicant: Dow Silicones Corporation, Midland, MI (US)

(72) Inventors: Dorab Bhagwagar, Auburn, MI (US); Peng Wei, Shanghai (CN); Qianqing Ge, Shanghai (CN); Yan Zheng, Shanghai (CN); Zhanjie Li, Auburn, MI (US)

(73) Assignee: DOW SILICONES CORPORATION, Midland, MI (US)

( * ) Notice: Subject to any disclaimer, the term of this patent is extended or adjusted under 35 U.S.C. 154(b) by 117 days.

(21) Appl. No.: 17/439,855

(22) PCT Filed: Oct. 28, 2020

(86) PCT No.: PCT/CN2020/124320
§ 371 (c)(1),
(2) Date: Sep. 16, 2021

(87) PCT Pub. No.: WO2022/087880
PCT Pub. Date: May 5, 2022

(65) Prior Publication Data
US 2023/0090031 A1 Mar. 23, 2023

(51) Int. Cl.
*C08L 83/04* (2006.01)
*C08K 3/013* (2018.01)

(52) U.S. Cl.
CPC .............. *C08L 83/04* (2013.01); *C08K 3/013* (2018.01); *C08K 2201/001* (2013.01)

(58) Field of Classification Search
CPC ... C08L 83/04; C08K 3/013; C08K 2201/001; C08K 5/5415; C08K 5/5419; C08K 5/5425; C09K 5/08
See application file for complete search history.

(56) References Cited

U.S. PATENT DOCUMENTS

| | | | | |
|---|---|---|---|---|
| 4,477,641 A * | 10/1984 | Matsumoto | ............ | C08L 83/14 528/31 |
| 4,766,176 A | 8/1988 | Lee et al. | | |
| 5,804,631 A * | 9/1998 | Mine | ........................ | C08K 3/08 524/440 |
| 6,174,841 B1 * | 1/2001 | Yamada | ............... | C10M 111/04 257/713 |
| 6,579,654 B1 | 6/2003 | Marko et al. | | |
| 7,592,383 B2 * | 9/2009 | Fukui | .................. | H01L 23/3737 524/588 |
| 8,383,005 B2 * | 2/2013 | Tsuji | ........................ | C09K 5/14 252/78.3 |
| 10,920,078 B2 | 2/2021 | Grasmann et al. | | |
| 10,968,317 B2 | 4/2021 | Gohndrone et al. | | |
| 11,059,971 B2 * | 7/2021 | Liu | ..................... | H01L 23/3737 |
| 11,098,163 B2 | 8/2021 | Gohndrone et al. | | |
| 11,535,751 B2 * | 12/2022 | Hoffmüller | .......... | C09D 5/1675 |
| 2004/0254275 A1 * | 12/2004 | Fukui | ..................... | C08L 83/04 524/261 |
| 2007/0293624 A1 | 12/2007 | Matsumoto et al. | | |
| 2011/0188213 A1 | 8/2011 | Domae et al. | | |
| 2020/0354574 A1 | 11/2020 | Wei et al. | | |

FOREIGN PATENT DOCUMENTS

| | | |
|---|---|---|
| CN | 1161969 | 10/1997 |
| CN | 101665573 | 3/2010 |
| CN | 104507990 | 4/2015 |
| WO | 2000069918 | 11/2000 |
| WO | 2019005393 | 1/2019 |
| WO | 20190136654 | 7/2019 |
| WO | 2020131367 | 6/2020 |
| WO | 2022051207 | 3/2022 |

OTHER PUBLICATIONS

Search Report from corresponding Chinese Application No. 202080037689.9 dated Dec. 22, 2022.
First Office Action Report Letter from corresponding Japanese Application No. 2021-574778 dated Nov. 10, 2022.

* cited by examiner

*Primary Examiner* — Jane L Stanley
(74) *Attorney, Agent, or Firm* — Steven W. Mork

(57) ABSTRACT

A composition contains an organopolysiloxane having the average chemical structure (I):

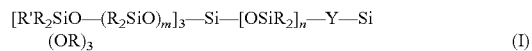

where: R is independently in each occurrence selected from alkyl, aryl, substituted alkyl and substituted alkyl groups having from one to 8 carbon atoms; R' is independently in each occurrence selected from R and terminally unsaturated alkylene groups having from 2 to 6 carbon atoms; Y is selected from a group consisting of: X, and X—$(R_2SiO)_p$ $SiR_2$—X; where p has an average value in a range of one to 3; and X is independently in each occurrence selected from alkylene and substituted alkylene groups having from one to 6 carbon atoms; and the average values for subscripts m and n are each greater than zero and independently selected so that the average value for the sum of all of the average m values and the average n value is in a range of 30-200.

10 Claims, No Drawings

TRIALKOXY FUNCTIONAL BRANCHED SILOXANE COMPOSITIONS

FIELD OF THE INVENTION

The present invention relates to trialkoxy functional branched siloxanes and compositions containing such siloxanes.

INTRODUCTION

Thermal grease compositions are commonly used in the electronic industry to thermally couple components to help dissipate heat. Often, thermal grease composition are polysiloxane matrices filled with thermally conductive fillers. Challenges common in thermal grease compositions are pump-out, flow-out and high composition viscosity.

Pump-out is a phenomenon that is particularly troublesome in thin bond line applications (bond line thicknesses of 200 micrometers or less). Pump-out often occurs when the components thermally coupled by a thermal grease repeatedly expand and contract with temperature changes, especially if one of the coupled components changes dimensions or shape to a greater extent than the other. Pump-out is especially prevalent when thermal grease is used directly in contact with a bare die. Pump-out is the driving out of thermal grease from between the coupled components resulting in bare spots that once were coated with the thermal grease and a decrease in thermal coupling between coupled components. Pump-out can often be accompanied by phase separation of the polysiloxane matrix material and the thermally conductive filler, which also decreases thermal coupling between components and can result in viscosity buildup and cracking of the thermal grease. Pump-out is undesirable for a thermal grease. One way to reduce pump-out is to use a curable thermal grease, which is a grease that can undergo crosslinking reactions after it is applied to stabilize the movement of the thermal grease component. However, curable thermal greases typically require particular care in packaging and storing to inhibit premature curing and usually require a curing step after application. It would be desirable to minimize pump-out of thermal grease without requiring a curable thermal grease composition, especially while achieving a thermal conductivity of at least 4 Watts per meter*Kelvin (W/m*K).

One way to achieve a high thermal conductivity is by loading a thermal grease with high concentrations of thermally conductive filler. While increasing the thermal conductivity of a thermal grease is desirable, the increase in viscosity of highly filled thermal grease is not desirable. Thermal greases in thin bond line applications are often applied to a substrate by a screen printing process. If the viscosity of the thermal grease is too high then they cannot be screen printed. So, in practice, there is a balance required between thermal conductivity and screen printability (viscosity). It is desirable to identify a non-curable thermal grease that is resistant to pump-out, and that also achieves a thermal conductivity of at least 4 Watt per meter*Kelvin (W/m*K) and that is screen printable.

Another application of thermal grease, typically in the form of a curable thermal grease, is in thermally coupling gap filler applications where the bond line thickness of the grease is on the order of 0.2 to 2 millimeters. These applications often suffer from flow-out, even when using a curable thermal grease. Flow-out typically occurs between components thermally coupled by a thick bond line of thermal grease and that are oriented in a vertical orientation so that the components are side-by-side (vertically oriented) rather than above one another (horizontally oriented). In such an orientation, gravity tends to cause the thermal grease to flow or sag downwards out from between the components it is intended to thermally couple. The thermal grease can also undergo cracking. It is desirable to identify a way to reduce the flow-out of thermal greases in vertical thermally coupling gap filler applications.

It would advance the art to discover an organopolysiloxane that can act as a matrix material for a non-curable thermal grease that is resistant to pump-out, and that also achieves a thermal conductivity of at least 4 Watt per meter*Kelvin (W/m*K) and that is screen printable. It would also be desirable to identify an additive for curable thermal compositions for use in thermally coupling gap filler applications that reduces flow-out in vertically oriented applications. It would be even more desirable to identify an organopolysiloxane that can both act as a matrix material for a non-curable thermal grease that is resistant to pump-out, and achieves a thermal conductivity of at least 4 Watt per meter*Kelvin (W/m*K) and that is screen printable as well as works as an additive for curable thermal compositions suitable for use in thermally coupling gap filler applications that reduces flow-out in vertically oriented applications.

BRIEF SUMMARY OF THE INVENTION

The present invention provides a organopolysiloxane that can act as a matrix material for a non-curable thermal grease that is resistant to pump-out, and that also achieves a thermal conductivity of at least 4 Watt per meter*Kelvin (W/m*K) and that is screen printable. Surprisingly, the organopolysiloxane can further work as an additive that reduces flow-out in curable thermal compositions suitable for use as thermally coupling gap filler in vertically oriented applications even at loadings of less than 0.5 wt % of the composition weight.

The present invention is a result of discovering a Q-branched polyorganosiloxane that has one siloxane branching point (a "Q" siloxane unit) with four polysiloxane chains attached thereto, three of which are alkyl or alkenyl terminal and one of which is trialkoxy terminal. This particular structure has surprising been discovered to solve the problems set forth above.

In a first aspect, the present invention is a composition comprising an organopolysiloxane having the average chemical structure (I):

$$[R'R_2SiO\text{---}(R_2SiO)_m]_3\text{---}Si\text{---}[OSiR_2]_n\text{---}Y\text{---}Si(OR)_3 \qquad (I)$$

where: R is independently in each occurrence selected from alkyl, aryl, substituted alkyl and substituted alkyl groups having from one to 8 carbon atoms; R' is independently in each occurrence selected from R and terminally unsaturated alkylene groups having from 2 to 6 carbon atoms; Y is selected from a group consisting of: X, and X—(R$_2$SiO)$_p$SiR$_2$—X; where p has an average value in a range of one to 3; and X is independently in each occurrence selected from alkylene and substituted alkylene groups having from one to 6 carbon atoms; and the average values for subscripts m and n are each greater than zero and independently selected so that the average value for the sum of all of the average m values and the average n value is in a range of 30-200. The composition can comprise thermally conductive fillers.

In a second aspect, the present invention is an article comprising two objects, for example a bare die and a heat sink, thermally coupled by the composition of the first aspect that further comprises thermally conductive fillers.

DETAILED DESCRIPTION OF THE INVENTION

Test methods refer to the most recent test method as of the priority date of this document when a date is not indicated with the test method number. References to test methods contain both a reference to the testing society and the test method number. The following test method abbreviations and identifiers apply herein: ASTM refers to ASTM International methods; EN refers to European Norm; DIN refers to Deutsches Institut für Normung; ISO refers to International Organization for Standards; and UL refers to Underwriters Laboratory.

Products identified by their tradename refer to the compositions available under those tradenames on the priority date of this document.

"Multiple" means two or more. "And/or" means "and, or as an alternative". All ranges include endpoints unless otherwise indicated. Unless otherwise stated, all weight-percent (wt %) values are relative to composition weight and all volume-percent (vol %) values are relative to composition volume.

"Alkyl" refers to a hydrocarbon radical derivable from an alkane by removal of a hydrogen atom. An alkyl can be linear or branched.

"Substituted alkyl" refers to a radical similar to an alkyl except where a non-hydrogen group resides in place of one or more than one hydrogen atom. For instance, an alkyl where one or more of the hydrogen atoms have been replaced with fluorine atoms constitutes a substituted alkyl.

"Aryl" refers to a radical formable by removing a hydrogen atom from an aromatic hydrocarbon. "Substituted aryl" refers to a radical similar to an aryl except where a non-hydrogen group resides in place of one or more than one hydrogen atom. For instance, an aryl where one or more of the hydrogen atoms have been replaced with fluorine atoms constitutes a substituted aryl.

"Bare die" refers to an exposed integrated circuit on silicon that does not have an integrated heat spreader.

"Kinematic viscosity" for individual polysiloxanes is determined by ASTM D 445 using a glass capillary Cannon-Fenske type viscometer at 25 degrees Celsius (° C.) unless otherwise stated.

Determine chemical structure for polysiloxanes by standard $^1$H, $^{13}$C and $^{29}$Si nuclear magnetic resonance (NMR) analysis. Determine average particle size for filler particles as the median particle size (D50) using laser diffraction particle size analyzers (CILAS920 Particle Size Analyzer or Beckman Coulter LS 13 320 SW) according to the operation software.

The present invention is a composition comprising, or consisting of, an organopolysiloxane having the average chemical structure (I):

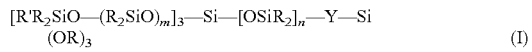

(I)

where:
R is independently in each occurrence selected from alkyl, aryl, substituted alkyl and substituted alkyl groups having from one to 8 carbon atoms. For instance, R can be selected from a group consisting of substituted or non-substituted forms of any one of the following or subset of the following: methyl, ethyl, propyl, butyl, pentyl, hexyl, and phenyl. As an example, each R can be methyl R' is independently in each occurrence selected from R and terminally unsaturated alkenyl groups having from 2 to 6 carbon atoms. For instance, R' can be selected from a group consisting of substituted or non-substituted forms of any one of the following or any subset of the following: methyl, ethyl, propyl, butyl, pentyl, hexyl, phenyl, vinyl, and allyl groups. As an example, each R' can be vinyl.

Y is a divalent component that is bonded to two silicon atoms and selected from a group consisting of: X, and X—$(R_2SiO)_p SiR_2$—X; where p has an average value in a range of one to 3; and X is independently in each occurrence selected from alkylene and substituted alkylene groups having from one to 6 carbon atoms. Desirably, X is selected from —$CH_2$—, —$CH_2CH_2$—, and —$CH_2CH_2CH_2$—. Desirably, Y is X—$(R_2SiO)_p SiR_2$—X where X is —$CH_2CH_2$— and p is one.

The values for subscripts m and n are each greater than zero and independently selected so that the degree of polymerization (DP), which is the sum of the average value of all of the m values and the n value, is in a range of 30 or more, 40 or more, 50 or more, 60 or more 70 or more, 80 or more, 90 or more, 95 or more, 96 or more, 100 or more, 110 or more, 120 or more, 124 or more, 130 or more, 140 or more 150 or more, 150 or more, 160 or more, 170 or more, 174 or more, 180 or more, even 190 or more, while at the same time is 200 or less, and can be 190 or less, 180 or less, 170 or less, 160 or less, 150 or less, 140 or less, 130 or less, 120 or less, 110 or less, even 100 or less. The average values for m and n can be, and typically are, the same. In one desirably organopolysiloxane of the present invention, m and n have the same average value and each have average values selected from 23 or more, 24 or more, 25 or more, 26 or more, 27 or more, 28 or more, 29 or more, 30 or more, 32 or more, 34 or more, 36 or more, 38 or more, 40 or more, even 42 or more while at the same time having an average value such that the sum of the m and n values is in an acceptable range as stated above.

Particularly desirable organopolysiloxanes have chemical structure (I) has where each R is methyl, each R' is vinyl, n and m have the same average value that is selected from a value of 23 or more, 30 or more, 40 or more or, even 42 or more while at the same time is a value of 43 or less, 40 or less, or even 23 or less; and Y is X—$(R_2SiO)_p SiR_2$—X with X in each occurrence is an alkylene having 2 carbon atoms, p has a value of one and R is methyl.

The composition of the present invention can comprise a thermally conductive filler. Thermally conductive fillers include any particulate material that has a higher thermal conductivity than the organopolysiloxane. The thermally conductive filler can be any one or any combination of more than one filler selected from a group consisting of metal particles, metal oxide particles, metal nitride particles, non-metal nitride particles and metal coated particles. Examples of metal particles include aluminum particles, silver particles, copper particles, and nickel particles. Examples of metal oxide particles include magnesium oxide, aluminum oxide, aluminum oxide trihydrate and zinc oxide. Examples of metal nitride particles aluminum nitride. Examples of non-metal nitride particles include boron nitride. Examples of metal coated particles include metal coated glass particles (for example, silver coated glass particles).

The composition can contain 80 weight-percent (wt %) or more, 85 wt % or more, 90 wt % or more, even 92 wt % or more thermally conductive filler while at the same time typically contains 98 wt % or less, 97 wt % or less, 96 wt % or less, even 95 wt % or less thermally conductive filler based on composition weight.

Each type of thermally conductive filler typically has an average particle size of 200 micrometers or less, 150 micrometers or less, 100 micrometers or less, 75 micrometers or less, 50 micrometers or less, 25 micrometers or less, 20 micrometers or less, 15 micrometers or less, 10 micrometers or less, even 5 micrometers or less 2 micrometers or less or even one micrometer or less while at the same time typically have an average particle size of 0.1 micrometer or more, 0.5 micrometers or more, one micrometer or more, 2 micrometers or more, 5 micrometers or more, 10 micrometers or more, 25 micrometers or more, even 50 micrometers or more.

The thermally conductive filler particles can have any shape, such as platelet, irregular, or spherical. "Spherical" particles have an aspect ratio of 1.0+/−0.2. "Irregular" shaped particles have an aspect ratio other than 1.0+/−0.2 and have at least three faces evident by SEM imaging, distinguishing the irregular particles from "platelets", which have an aspect ratio other than 1.0+/−0.2 have 2 faces. Determine the aspect ratio of a particle using scanning electron microscope (SEM) imaging and by taking the average ratio of the longest dimension (major axis) and shortest dimension (minor axis) of at least ten particles.

The composition can contain a combination of different thermally conductive fillers that can be the same or different composition or shape, but that have different average particles sizes. For example, the composition can comprise any combination of thermally conductive fillers selected from spherical aluminum particles have an average particle size of 9 micrometers, spherical aluminum particles have an average particle size of 2 micrometers, zinc oxide particles having an average particle size of 0.12 micrometers, spherical aluminum oxide particles having an average particle size of 2 micrometers, irregular aluminum oxide particles have an average particle size of 35 micrometers, spherical aluminum oxide with an average particle size of 90 micrometers, and platelet boron nitride particles having an average size of 30 micrometers.

Compositions that contain thermally conductive filler also can, and typically do, contain one or more than one filler treating agent (or simply "treating agent"). Treating agents are useful to assist dispersing and stabilizing the dispersion of filler particles in the matrix material. Desirably, the conductive material is one or more than one material selected from alkyltrialkoxy silanes and monotrialkoxy terminated diorganopolysiloxanes. Preferably, the alkyl of the alkyltrialkoxy silanes contain one more, and can contain 2 or more, 4 or more, 6 or more, 8 or more, 10 or more, even 12 or more carbon atoms while at the same time typically contain 14 or fewer, even 12 or fewer, 10 or fewer carbon atoms. Each alkoxy of the alkyltrialkoxy silanes desirably contain one or more and at the same time 6 or fewer, 4 or fewer, even 2 or fewer carbon atoms. One desirably alkyltrialkoxy silane is n-decyltrimethoxy silane. The monotrialkoxy terminated diorganopolysiloxane desirably has the following chemical structure (II):

$$R''_3SiO[R''_2SiO]_m Si(OR'')_3 \quad (II)$$

where each R" is independently in each occurrence selected from alkyl groups having from one to 12 carbon atoms, and subscript m corresponds to the degree of polymerization for the material and has a value of 20 or more, 30 or more, 40 or more, 60 or more 80 or more even 100 or more and desirably 110 or less. Desirably, R" in each occurrence is methyl (—CH$_3$) and more desirably, the average value for a is also in a range of 30 to 110.

Desirably, the treating agent is a combination of n-decyltrimethoxy silane and monotrimethoxy terminated dimethylpolysiloxane having an average degree of polymerization of 110.

The amount of treating agent in the non-curable thermally conductive material is desirably 0.1 wt % or more, and can be 0.2 wt % or more, 0.3 wt % or more, 0.4 wt % or more, 0.5 wt % or more, 0.8 wt % or more, 1.0 wt % or more, 1.5 wt % or more, even 2.0 wt % or more while at the same time is typically 3.0 wt % or less and can be 2.5 wt % or less, 2.0 wt % or less, 1.5 wt % or less, 1.2 wt % or less, 1.0 wt % or less, 0.9 wt % or less, 0.8 wt % or less, 0.7 wt % or less, 0.6 wt % or less, 0.5 wt % or less, 0.4 wt % or less, 0.3 wt % or less, even 0.2 wt % or less with wt % relative to non-curable thermally conductive material weight.

The composition of the present invention can be a thermally conductive composition such as thermal interface material (TIM). TIMs are useful for thermally coupling two articles together and are often used in electronic devices to thermally couple components to help dissipate heat more efficiently in the device. TIM is often used to couple bare die components to rigid housings or other components to facilitate dissipation of heat from the bare die. TIM applications include thin bond line application as well as more gap filling applications.

TIMs can be non-curable grease materials or curable composition materials. Non-curable grease materials are often used for thin bond line applications and are desirable for their ease of storage and handling. However, some applications benefit from a curable composition where the TIM is crosslinked (cured) in place between the components it thermally couples. The crosslinking stabilized the TIM from movement, such as a phenomenon known as pump-out. Curable compositions have an added challenge in storage and handling, however, in that they need to be stabilized against premature curing.

Curable composition materials typically cure by hydrosilylation, condensation, or both hydrosilylation and condensation. Hydrosilylation curable compositions typically contain alkenyl functional polyorganosiloxanes and silylhydride functional crosslinkers. Condensation curable compositions typically contain alkoxyl and/or hydroxyl functional polysiloxanes.

Non-curable grease materials are compositions that are free a combination of alkenyl functional polyorganosiloxanes and silyl-hydride functional crosslinkers that can undergo hydrosilylation and contain less than 5 wt % based on non-curable grease material weight of alkoxy and hydroxyl functional polysiloxanes that can undergo condensation reactions. Desirably, non-curable grease materials are free of combinations of reactive functionalities on components that can undergo any type of crosslinking reaction that is chemically or thermally induced, even more preferably free of combinations of components with functional groups that can also be ultraviolet light induced crosslinking.

The composition of the present invention can be a non-curable grease material that comprises the organopolysiloxane of chemical structure (I) at a higher concentration than any other polysiloxane in the composition. In fact, the non-curable grease material can have as the only organopolysiloxane the organopolysiloxane of chemical structure (I). The non-curable grease can comprise, or consist of, the organopolysiloxane of chemical structure (I), thermally conductive filler as described above, and optionally one or more treating agent as described above.

The composition can alternatively be a curable composition material. For instance, the composition can be hydrosilylation curable, meaning the composition contains reactive alkenyl groups and silyl-hydride groups and generally a hydrosilylation catalyst. When a curable composition material, the composition can contain a second vinyl-functional polyorganosiloxane that has a structure other than that of chemical structure (I) and a silyl-hydride functional cross-linker, where the polyorganosiloxane of chemical structure (I) is present at a lower concentration than the second vinyl-functional polyorganosiloxane. The organopolysiloxane of chemical structure (I) can be present at a concentration as low as one wt % or less, 0.75 wt % or less, 0.5 wt % or less, even 0.4 wt % or less while at the same time is typically present at a concentration of 0.05 wt % or more, 0.10 wt % or more, 0.2 wt % or more, 0.3 wt % or more, even 0.4 wt % or more with wt % relative to composition weight. The composition can further comprise a hydrosilylation catalyst, which is typically a platinum based catalyst such as Karstedt's catalyst and/or Speier's catalyst ($H_2PtCl_6$). Karstedt's catalyst is an organoplatinum compound derived from divinyl containing disiloxane (1,1,3,3,-tetramethyl, 1,3-divinyldisiloxane). Curable compositions that comprise the organopolysiloxane of the present invention are particularly desirable because they tend to have lower level of flow-out in vertically oriented applications (have greater vertical stability) than similar compositions without the organopolysiloxane.

TIM compositions of the present invention are particularly desirable in thermally coupling components, especially components of an electronic device. TIM compositions of the present invention can thermally couple any two devices including a bare die and heat sink of an electronic device. Such TIM compositions demonstrate less pump-out and less flow-out than equivalent compositions that do not contain the organopolysiloxane of the present invention.

EXAMPLES

Table 1 identifies the materials for use in the Samples. "Vi" refers to a vinyl group. SYL-OFF, DOWSIL are trademarks of The Dow Chemical Company. Cab-O-Sil is a trademark of Cabot Corporation.

TABLE 1

| Material | Description | Source |
|---|---|---|
| Silane-1 | 1-(2-(trimethoxysilyl)ethyl)-1,1,3,3-tetramethyldisiloxane | Available from Macklin Biochemical Company |
| Catalyst-1 | 1,3-diethenyl-1,1,3,3,-tetramethydisiloxane platinum complex | Available as SYL-OFF ™ 4000 Catalyst from The Dow Chemical Company. |
| Catalyst-2 | Catalyst-1 encapsulated with siloxane resin | Prepare as described following Table 1 |
| QVP-1 | Vinyldimethyl terminated Q-branched polysiloxane having a kinematic viscosity of 200 cSt and vinyl content of 0.95 wt % having the following average chemical structure: [Vi(CH$_3$)SiO—(CH$_3$)$_2$SiO)40]$_4$-Si | Synthesize according to teachings in U.S. Pat. No. 7,592,424. |
| QVP-2 | Vinyldimethyl terminated Q-branched polysiloxane having a dynamic viscosity of 120 milliPascal*seconds (mPa*s) and vinyl content of 1.5 wt % having the following average chemical structure: [Vi(CH$_3$)$_2$SiO—((CH$_3$)$_2$SiO)$_{23.75}$]$_4$-Si | Synthesize according to teachings in U.S. Pat. No. 7,592,424. |
| QVP-3 | Vinyldimethyl terminated Q-branched polysiloxane having a kinematic viscosity of 80 cSt at 25° C. and vinyl content of 1.2 wt % having the following average chemical structure: [Vi(CH$_3$)$_2$SiO—((CH$_3$)$_2$SiO)$_{30}$]$_4$-Si | Synthesize according to teachings in U.S. Pat. No. 7,592,424. |
| QVP-4 | Vinyldimethyl terminated Q-branched polysiloxane having a dynamic viscosity of 180 cSt at 25° C. and vinyl content of 0.83 wt % having the following average chemical structure: [Vi(CH$_3$)$_2$SiO—((CH$_3$)$_2$SiO)$_{42.5}$]$_4$-Si | Synthesize according to teachings in U.S. Pat. No. 7,592,424. |
| QVP-5 | Vinyldimethyl terminated Q-branched polysiloxane having a dynamic viscosity of 250 cSt at 25° C. and vinyl content of 0.63 wt % having the following average chemical structure: [Vi(CH$_3$)$_2$SiO—((CH$_3$)$_2$SiO)$_{55}$]$_4$-Si | Synthesize according to teachings in U.S. Pat. No. 7,592,424. |
| VFP-1 | Vinyl dimethyl terminated polydimethylsiloxanes with nominal viscosity of 75 cSt and 1.25 wt % vinyl groups. | Available under the name DMS-V21 from Gelest |
| VFP-2 masterbatch | Homogeneous mixture of Vinyl dimethyl terminated polydimethylsiloxanes with nominal viscosity of 2157 cSt and 0.23 wt % vinyl groups having the following average chemical structure: Vi(CH$_3$)$_2$SiO—[(CH$_3$)$_2$)SiO]$_{293}$-Si(CH$_3$)$_2$Vi having dispersed therein 37 wt % silica filler by weight of the combination | Vinyl dimethyl terminated polydimethylsiloxane available under the name DMS-V31 from Gelest. Silica filler available under the name Cab-O-Sil ™ TS-530 from Cabot Corporation. Blend with sigma-blade mixer to form homogeneous paste. |
| VFP-3 | Vinyl dimethyl terminated polydimethylsiloxanes with nominal viscosity of 200 cSt and 0.62 wt % vinyl groups having the following average chemical structure: Vi(CH$_3$)$_2$SiO—[(CH$_3$)$_2$)SiO]$_{121}$-Si(CH$_3$)$_2$Vi | Available under the name DMS-V22 from Gelest |

TABLE 1-continued

| Material | Description | Source |
|---|---|---|
| NRF-1 | Phenylmethylsiloxane-dimethylsiloxane copolymer with viscosity of 100 cSt | Available under the name PMM-1202 from Gelest |
| Treating Agent 1 | n-decyltrimethoxysilane | Available under the name SID2670.0 from Gelest |
| Treating Agent 2 | Polydimethylsiloxane, monotrimethoxysiloxy and trimethylsiloxy terminated, having the following average chemical structure: $(CH_3)_3SiO[(CH_3)_2SiO]_{110}Si(OCH_3)_3$ | Synthesize according to the teachings in US2006/0100336 |
| Al-1 | Spherical aluminum particles having an average particle size of 9 micrometers | Available under the name TCP-9 from Toyal America |
| Al-2 | Spherical aluminum particles have an average particle size of 2 micrometers | Available under the name TCP-2 from Toyal America |
| $Al_2O_3$-1 | Spherical aluminum oxide with an average particle size of 2 micrometers | Available under the name AZ2-75 from Nippon Steel Chemical & Material Co., Ltd |
| $Al_2O_3$-2 | Spherical aluminum oxide with an average particle size of 35 micrometers | Available under the name A-SF-60 from Zhengshou Research Institute of Chalco of China |
| $Al_2O_3$-3 | Spherical aluminum oxide with an average particle size of 90 micrometers | Available as DAW-90 from Denka Company Limited of Japan. |
| BN-1 | Platelet boron nitride filler with average particle size of 30 micrometers | Available under the name PT-110 from Momentive Products, USA |
| ZnO-1 | Zinc oxide particles have an average particle size of 0.12 micrometers | Available under the name Zoco102 from Zochem Company. |
| Stabilizer | 40 wt % Copper phthalocyanine powder dispersed by 3-roll mill in 40 wt % trimethyl terminated polydimethylsiloxane 350 cSt; wt % relative to mixture weight. | Copper phthalocyanine powder available as catalog number 43650-09 from Alfa-Aesar. Polydimethylsiloxane available under the name DOWSIL ™ 200 Fluid, 350 cSt from The Dow Chemical Company. |
| Cure Inhibitor | Methyl(tris(1,1,-dimethyl-2-prpynyloxy))silane | Available from Alfa Chemistry |
| SiH Crosslinker | $(CH_3)_3SiO[(CH_3)_2SiO]_7[(CH_3)HSiO]_3Si(CH_3)_3$ | Available as HMS-301 from Gelest |

Synthesis of Catalyst 2. Prepare a mixture of: (a) 40 wt % of a blend of Catalyst-1 in a thermoplastic silicone resin (0.4 wt % platinum catalysis in the resin), where silicone resin has 78 mole-percent monophenylsiloxane units and 22 mol-percent dimethylsiloxane units, a softening point of 80-90° C.; (b) 55 wt % of a dimethylvinylsiloxy-terminated polydimethylsiloxane having a viscosity of 2 Pas*s at 25° C. and a vinyl content of 0.2 wt %; and (c) 5 wt % of a hexamethydisilazane-treated fumed silica. Prepare according to teaching in U.S. Pat. No. 4,766,176.

Synthesis of Organopolysiloxanes

Prepare samples of organopolysiloxanes as follows following the formulations in Table 2: Add to a glass reaction vessel the QVP or VFP component and Catalyst-1 component and begin stirring with a magnetic stirrer. Add Silane-1 drop-wise through an addition funnel and once addition is complete, continue stirring for 12 hours at 25° C. Monitor by nuclear magnetic resonance spectroscopy and infrared spectroscopy. Disappearance of the SiH peak indicates the reaction is complete.

TABLE 2

| | | QVP/VFP | | | |
|---|---|---|---|---|---|
| Sample | Name | Amount (weight-parts) | Silane-1 (weight-parts) | Catalyst -1 (weight-parts) | Vi/SiH ratio |
| 1 | QVP-1 | 97.01 | 2.95 | 0.04 | 4:1 |
| 2 | QVP-2 | 96.23 | 3.77 | 0.04 | 4:1 |
| 3 | QVP-3 | 97.01 | 2.95 | 0.04 | 4:1 |
| 4 | QVP-4 | 97.88 | 2.12 | 0.04 | 4:1 |
| 5 | QVP-5 | 98.39 | 1.61 | 0.04 | 4:1 |
| 6 | QVP-3 | 94.28 | 5.72 | 0.04 | 2:1 |
| 7 | VFP-3 | 96.85 | 3.15 | 0.04 | 2:1 |
| 8 | VFP-3 | 93.89 | 6.11 | 0.04 | 1:1 |

The polyorganosiloxanes have the following structures, where "Me" is a methyl group and "Vi" is a vinyl group:
Sample 1:
$[ViMe_2SiO(Me_2SiO)_{40}]_3$—Si—$[OSiMe_2]_{40}$-$(CH_2)_2$-$Me_2SiOSiMe_2$-$(CH_2)_2$—$Si(OCH_3)_3$
Q-Branched siloxane of Structure (I) with R=Me, R'=Vi, m=n=40, DP=160, Y=$(CH_2)_2$-$Me_2SiOSiMe_2$-$(CH_2)_2$:
Sample 2:
$[ViMe_2SiO(Me_2SiO)_{23.75}]_3$—Si—$[OSiMe_2]_{23.75}$-$(CH_2)_2$-$Me_2SiOSiMe_2$-$(CH_2)_2$—$Si(OCH_3)_3$
Q-Branched siloxane of Structure (I) with R=Me, R'=Vi, m=n=23.75, DP=95, Y=$(CH_2)_2$-$Me_2SiOSiMe_2$-$(CH_2)_2$:
Sample 3:
$[ViMe_2SiO(Me_2SiO)_{30}]_3$—Si—$[OSiMe_2]_{30}$-$(CH_2)_2$-$Me_2SiOSiMe_2$-$(CH_2)_2$—$Si(OCH_3)_3$ Q-Branched siloxane of Structure (I) with R=Me, R'=Vi, m=n=30, DP=120, Y=$(CH_2)_2$-$Me_2SiOSiMe_2$-$(CH_2)_2$:
Sample 4:
[$ViMe_2SiO(Me_2SiO)_{42.5}$]$_3$—Si—[$OSiMe_2$]$_{42.5}$-$(CH_2)_2$-$Me_2SiOSiMe_2$-$(CH_2)_2$—$Si(OMe)_3$
Q-Branched siloxane of Structure (I) with R=Me, R'=Vi, m=n=42.5, DP=170, Y=$(CH_2)_2$-$Me_2SiOSiMe_2$-$(CH_2)_2$:
Sample 5:
[$ViMe_2SiO(Me_2SiO)_{55}$]$_3$—Si—[$OSiMe_2$]$_{55}$-$(CH_2)_2$-$Me_2SiOSiMe_2$-$(CH_2)_2$—$Si(OMe)_3$
Q-Branched siloxane of Structure (I) with R=Me, R'=Vi, m=n=55, DP=220, Y=$(CH_2)_2$-$Me_2SiOSiMe_2$-$(CH_2)_2$:
Sample 6:
[$ViMe_2SiO(Me_2SiO)_{30}$]$_2$—Si—{[$OSiMe_2$]$_{30}$-$(CH_2)_2$-$Me_2SiOSiMe_2$-$(CH_2)_2$—$Si(OMe)_3$}$_2$
Q-branched siloxane with 2 vinyl capped arms and two trimethoxy capped arms; DP of 120
Sample 7:
$ViMe_2SiO$-$(Me_2SiO)_{121}$—$(CH_2)_2$-$Me_2SiOSiMe_2$-$(CH_2)_2$—$Si(OMe)_3$
vinyl terminal linear polysiloxane with DP of 121
Sample 8:
$(MeO)_3Si$—$(CH_2)_2$-$Me_2SiOSiMe_2$-$(CH_2)_2$-$(Me_2SiO)_{121}$—$(CH_2)_2$-$Me_2SiOSiMe_2$-$(CH_2)_2$—$Si(OMe)_3$
linear polysiloxane with DP of 121

Non-Curable TIM Compositions

Refer to Table 3 for the grease formulations listing the components in grams. Prepare compositions from the formulation by combining the component into a 100 milliliter speed-mixer cup and mix the components together with a FlackTek™ DAC250 speedmixer at 1500 revolutions per minute (RPM) for 2 minutes to obtain a flowable metal-polyorganosiloxane mixture. Transfer the mixture to a metal container and heat at 150° C. at 2.93 kiloPascal (22 Torr) pressure for one hour to achieve the non-curable Grease Sample. FlackTek is a trademark of Flacktek, Inc.

TABLE 3

| Grease | Matrix Material | | Treating Agent 1 | Treating Agent 2 | Al-1 | Al-2 | ZnO |
|---|---|---|---|---|---|---|---|
| | Component | Wt (g) | | | | | |
| 1 | Sample 2 | 7.09 | 0.17 | 0 | 50.25 | 25.12 | 17.37 |
| 2 | Sample 3 | 7.09 | 0.17 | 0 | 50.25 | 25.12 | 17.37 |
| 3 | Sample 4 | 7.09 | 0.17 | 0 | 50.25 | 25.12 | 17.37 |
| 4 | Sample 5 | 7.09 | 0.17 | 0 | 50.25 | 25.12 | 17.37 |
| 5 | Sample 6 | 7.09 | 0.17 | 0 | 50.25 | 25.12 | 17.37 |
| A | NRF-1 | 5.10 | 0.17 | 1.99 | 50.25 | 25.12 | 17.37 |
| B | Sample 7 | 7.09 | 0.17 | 0 | 50.25 | 25.12 | 17.37 |
| C | Sample 8 | 7.09 | 0.17 | 0 | 50.25 | 25.12 | 17.37 |
| D | QVP-3 | 7.09 | 0.17 | 0 | 50.25 | 25.12 | 17.37 |
| E | Non-reacted Sample 3* | 7.09 | 0.17 | 0 | 50.25 | 25.12 | 17.37 |

*The non-reacted Sample 3 was made the same as Sample 3 except no catalyst was included so it contains all the reactants used to make Sample 3, just not reacted to form the Q-branched polyorganosiloxane of Sample 3.

Characterize the non-curable grease compositions according to the following test methods. Results are in Table 4:

Viscosity at Dilation Point. Determine dynamic viscosity according to ASTM D4440-15 using ARES-G2 model instrument by TA Instruments equipped with 25 millimeter parallel plates (serrated steel). Testing conditions are based on strain sweep at 25° C. with strain: 0.01-300%, frequency: 10 radians/second. Measure viscosity at dilation point.

Thermal Conductivity. Determine the thermal conductivity of each sample according to ISO22007-2:2015 using Hot Disk Instrument TPS 2500 S from Hot Disk AB, Götenborg, Sweden. Use sensor C5501. Fill two cups with sample material with the planar sensor between the cups. Analysis conditions are: fine tuned analysis, temperature drift compensation and time correction, calculation with selected between points 50-150.

Printability Testing. Determine the printability of the samples using an 80 mesh metal screen to print a pattern of 25 centimeters by 25 centimeters with 200 micrometer thickness. Hold the screen above a heat sink an apply 5 g of sample on top of the screen. Use a squeegee held at a 45° angle to the screen and heat sink and transfer the sample through the screen onto the heat sink with the squeegee by applying a constant force at a constant drawing speed. Rank the printability using the following rankings: GOOD: The grease can be deposited on the heat sink. MEDIUM: grease is deposited through the screen to cover only about 70-80% of the heat sink area and additional squeegee attempts are needed to deposit grease fully. BAD: Grease is only deposited through the screen to cover less than 25% of heat sink and is too thick for good screen printability.

Pump-Out Resistance. Use the Thermal Cycling test as follows. Apply sample by stencil print onto the heat sink of a Gigabyte AMD Radeon RX Vega 4 8 GB HBM2 Graphics card and then assemble the graphics card and install into a computer. The following computer components are used for testing: CPU: AMD Ryzen 7 2700X 8-Core; Motherboard: ASUS TUF X470-PLIS GAMING; Memory: KINSTON DDR4 266 8 GB; Graphics Card: Gigabyte Radeon Computer Graphics Card (GV-RXVEGA64GAMING OC-8GD); Solid State Drive: Intel SSD 760P Series (256 GB, M.2 80 mm PCIe 3.0×4, 3D2, TLC; Monitor: Del U2417H; Keyboard: Dell; Mouse: Dell; PC Case: Antec P8 ATX; Power Supply: Antec NEO750W; KVM: MT-viki HK05.

Conduct the thermal cycling test by running the FurMark GPU stress test software available for free download at: https://geeks3d.com/furmark/. A scrip (in AutoIt) includes steps to turn on and off Furmark software and steps to change fan speed in order to control the temperature of the GPU card. The AutoIt script includes: (1) Open Furmark Program; (2) Activate Furmark Stress Test Routine; (3) Turn fan speed to 30% of its maximum speed for 200,000 milliseconds for the heating cycle; (4) Stop Stress Test Routine; (5) Turn off Furmark Program; (6) Turn fan speed to 90% of its maximum speed for 200,000 milliseconds for the cool cycle; (7) repeat the sequence. The procedure is used to cycle the temperature on the GPU card from 35° C. to 85° C. and back down to 35° C. After running 5000 cycles, shut down the computer. Remove the graphics card. Open the graphics card and record with high-resolution camera on a Keyence VHX digital microscope the heat sink and die on the electronic board. Measure areas without sample material (bare spots) on both the heat sink and die due to pump-out during the cycling test. Calculate the quantitative area of the bare spots using readily available "sketchandcalc" software (or any equivalent software that can calculate area with digital imagery). The total bare spot area due to grease pump-out is divided by the total GPU die area (495 square millimeters) to determine % area of bare spot on the die. Results are classified as follows: EXCELLENT=less than 5% area of bare spot on the die; MODERATE=5-10% area of bare spot on the die; and BAD=greater than 10% area of bare spot on the die.

TABLE 4

| Grease | Thermal Conductivity (W/m*K) | Viscosity at Dilatant Point (Pa*s) | Screen Printability | Pump-Out Resistance |
|---|---|---|---|---|
| 1 | 4.9 | 124 | GOOD | EXCELLENT |
| 2 | 4.9 | 115 | GOOD | EXCELLENT |
| 3 | 4.8 | 131 | GOOD | EXCELLENT |
| 4 | 4.9 | -NM-* | BAD | -NM-* |
| 5 | 5.0 | 220 | BAD | EXCELLENT |
| A | 5.2 | 104 | GOOD | BAD |
| B | 4.7 | -NM-* | BAD | BAD |
| C | -NM-* | -NM-* | BAD | -NM-* |
| D | 5.13 | 207 | BAD | -NM-* |
| E | -NM-* | -NM-* | BAD | -NM-* |

*Too viscous to measure

Greases A-C, which have linear polysiloxane as a matrix material, all performed poorly in Pump-Out resistance. Greases B and C, which had terminal functionality similar to the Q-branched performed particularly poorly also in being highly viscous.

Grease D uses a matrix material that is a Q-branched polyorganosiloxane but that is fully terminated with vinyl groups. It performs poorly with too high of a viscosity.

Grease E demonstrates the need to actually form the Q-branched polyorganosiloxane of the present invention and that the components used to make it are not sufficient to perform as an adequate matrix material.

Greases 1-3, which use a Q-branched polyorganosiloxane of the present invention as a matrix material, all perform well in all characterizations. These Greases demonstrate the ability of the polyorganosiloxane of the present invention to perform well as a matrix material for a non-curable TIM grease.

Greases 4 and 5 demonstrated poor screen printability. Grease 4 utilizes a Q-branched polyorganosiloxane with a DP above 200. Grease 5 utilizes a Q-branched polyorganosiloxane with 2 vinyl capped arms and two trimethoxy capped arms instead of just one as is required in the present invention.

Curable TIM Compositions

Refer to Table 5 for the grease formulations listing the components in grams. Prepare the compositions from the formulations by combining the VFP components, Treating Agents and stabilizer in a mixer, then adding the ZnO and Al$_2$O$_3$-1 fillers and mixing the components together. Add the larger fillers Al$_2$O$_3$-2, Al$_2$O$_3$-3 and BN, and mix again for 60 minutes at 30-40 RPM under vacuum at 25° C. using a sigma-blade mixer. Heat the mixture to 130° C. while mixing at 45 RPM under vacuum and keep mixing at 130° C. for 30 minutes. Cool the mixture down to 25° C. Add the SiH Crosslinker, Cure Inhibitor (and Sample 1 if used) and mix for 15 minutes. Add Catalyst-2 and mix for another 15 minutes at 30 RPM with nitrogen purge (0.4 cubic meters per hour).

TABLE 5

| Material | Curable Grease F (g) | Curable Grease 6 (g) |
|---|---|---|
| VFP-1 | 2.04 | 1.64 |
| VFP-2 | 0.25 | 0.25 |
| Stabilizer | 0.12 | 0.12 |
| Treating Agent 1 | 0.25 | 0.25 |
| Treating Agent 2 | 2.09 | 2.09 |
| ZnO | 12.73 | 12.73 |
| Al$_2$O$_3$-1 | 22.88 | 22.88 |
| Al$_2$O$_3$-2 | 28.74 | 28.74 |
| Al$_2$O$_3$-3 | 29.94 | 29.94 |
| BN | 0.50 | 0.50 |
| Cure Inhibitor | 0.004 | 0.004 |
| SiH Crosslinker | 0.34 | 0.34 |
| Catalyst-2 | 0.03 | 0.03 |
| Sample 1 | 0 | 0.4 |

Vertical Stability Testing. Place one mL of the curable grease on an aluminum panel (Q-panel AL-35, chromate pretreated). Place two pieces of one-millimeter thick aluminum spacers on the same side of the aluminum panel and on either side of the curable grease. Place a glass slide (Corning Micro Slides, plain, dimension 75×50 millimeters and thickness of 0.96-1.06 millimeters) on top of the thermal grease and press to achieve a one-millimeter thick film of curable grease between the glass slide and aluminum panel. Clamp the glass slide and aluminum plate together with clamps on two sides of the panel to form a composite structure. Place the composite structure oriented vertically (panel and slide are vertical) in an ESPEC chamber for −40 to 125° C. temperature cycling. Cycle the temperature at a rate of 3° C. per minute while dwelling for 30 minutes at the high and low temperature points. Characterize how the composite structure performs through the temperature cycling by observing the curable grease. If there is no observable change in grease position during the test then the performance is GOOD for stayability, otherwise it is BAD.

Table 6 provides the Vertical Stability Testing results for the two curable greases at 1 week, 2 weeks and 3 weeks of testing.

TABLE 6

| Duration of Testing | Curable Grease F | Curable Grease 6 |
|---|---|---|
| 1 week | GOOD | GOOD |
| 2 weeks | BAD | GOOD |
| 3 weeks | BAD (complete failure) | GOOD |

The data reveals that including even 0.4 wt % of the organopolysiloxane of the present invention in a curable grease formulation dramatically improves the stayability in the vertical stability testing of curable thermal grease.

What is claimed is:

1. A composition comprising an organopolysiloxane having the average chemical structure (I):

[R'R$_2$SiO—(R$_2$SiO)$_m$]$_3$—Si—[OSiR$_2$]$_n$—Y—Si(OR)$_3$     (I)

wherein:
R is independently in each occurrence selected from alkyl, aryl, substituted alkyl and substituted alkyl groups having from one to 8 carbon atoms;
R' is independently in each occurrence selected from R and terminally unsaturated alkylene groups having from 2 to 6 carbon atoms;
Y is selected from a group consisting of: X and X—(R$_2$SiO)$_p$SiR$_2$—X;
wherein p has an average value in a range of one to 3; and
X is independently in each occurrence selected from alkylene and substituted alkylene groups having from one to 6 carbon atoms; and
the average values for subscripts m and n are each greater than zero and independently selected so that the average value for the sum of all of the average m values and the average n values is in a range of 30-200.

2. The composition of claim 1, where each m and n have the same average value.

3. The composition of claim 1, where each R is methyl, each R' is vinyl, n and m have the same average value that is selected from a value in a range of 23 to 43, and Y is X—$(R_2SiO)_p SiR_2$—X wherein X in each occurrence is an alkylene having 2 carbon atoms and p has a value of one.

4. The composition of claim 1, wherein the sum of all of the m values and the n values has an average value in a range of 30 to 170.

5. The composition of claim 1, wherein the composition further comprises thermally conductive fillers.

6. The composition of claim 5, wherein the composition contains 80 to 98 weight-percent thermally conductive filler.

7. The composition of claim 1, wherein the composition further comprises a filler treating agent.

8. The composition of claim 7, wherein either:
   a. the composition is a non-curable grease material and comprises the organopolysiloxane at a higher concentration than any other polysiloxane in the composition; or
   b. the composition is a curable composition material and comprises a second vinyl-functional polyorganosiloxane that has a structure other than that of chemical structure (I) and a silyl-hydride functional crosslinker, where the polyorganosiloxane of chemical structure (I) is present at a lower concentration that the second vinyl-functional polyorganosiloxane.

9. An article comprising two objects thermally coupled by the composition of claim 1.

10. The article of claim 9, wherein one of the objects is a bare die and the other object is a heat sink.

* * * * *